United States Patent
Massa et al.

(10) Patent No.: US 12,536,582 B2
(45) Date of Patent: Jan. 27, 2026

(54) METHOD AND SYSTEM FOR IMPLEMENTING A TOOL FOR DETECTING BAD ACTORS THAT UNFAIRLY PROFIT FROM CONFIDENTIAL INFORMATION

(71) Applicant: JPMorgan Chase Bank, N.A., New York, NY (US)

(72) Inventors: James Massa, Water Mill, NY (US); Viraaji Mothukuri, Alpharetta, GA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 284 days.

(21) Appl. No.: 18/219,338

(22) Filed: Jul. 7, 2023

(65) Prior Publication Data
US 2025/0014095 A1    Jan. 9, 2025

(51) Int. Cl.
*G06F 40/30* (2020.01)
*G06F 40/279* (2020.01)
*G06Q 40/00* (2023.01)

(52) U.S. Cl.
CPC ........... *G06Q 40/00* (2013.01); *G06F 40/279* (2020.01); *G06F 40/30* (2020.01)

(58) Field of Classification Search
CPC .... G06F 40/279; G06F 40/284; G06F 40/289; G06F 40/30; G06Q 40/04; G06Q 40/024; G06Q 40/0421
USPC ................................ 704/1, 9; 705/37, 14.47
See application file for complete search history.

(56) References Cited

U.S. PATENT DOCUMENTS

| | | | | |
|---|---|---|---|---|
| 8,069,101 | B1* | 11/2011 | von Groll | G06Q 40/00 |
| | | | | 705/35 |
| 11,257,161 | B2* | 2/2022 | Sisk | G06Q 40/06 |
| 11,431,519 | B1* | 8/2022 | Bullard | G06Q 40/02 |
| 12,205,170 | B1* | 1/2025 | Schwartz | G06Q 40/04 |
| 2012/0059771 | A1* | 3/2012 | von Groll | G06Q 40/04 |
| 2013/0103561 | A1* | 4/2013 | Amos | G06Q 40/04 |
| | | | | 705/37 |
| 2013/0138577 | A1 | 5/2013 | Sisk | |
| 2016/0253750 | A1* | 9/2016 | Visbal | G06Q 40/02 |
| | | | | 707/737 |
| 2017/0032463 | A1* | 2/2017 | Hunter | G06Q 40/04 |

(Continued)

OTHER PUBLICATIONS

International Search Report dated Sep. 18, 2024, in International Patent Application No. PCT/US24/36899.

*Primary Examiner* — Martin Lerner
(74) *Attorney, Agent, or Firm* — Greenblum & Bernstein, P.L.C.

(57) ABSTRACT

A system for detecting bad actors that unfairly profit from confidential information. The system may include a processor and memory that stores instructions that, when executed by the processor, cause the processor to: obtain news articles from at least one news media source; categorize, by pertinent events, each news article according to the pertinent events to which the news articles pertain; score each news article according to a respective impact of each news article; designate, for each of the pertinent events to which the news articles pertain, a corresponding made-public-date; and calculating, for each event of the pertinent events to which the news articles pertain, a corresponding event impact score by aggregating a weighted set of the article impact scores that pertain to the corresponding event.

20 Claims, 4 Drawing Sheets

(56) References Cited

U.S. PATENT DOCUMENTS

| | | | |
|---|---|---|---|
| 2021/0110475 A1* | 4/2021 | Singh | G06F 40/289 |
| 2021/0182493 A1* | 6/2021 | Dey | G06F 40/30 |
| 2022/0230253 A1 | 7/2022 | Kim et al. | |
| 2022/0358150 A1* | 11/2022 | Ramkumar | G06F 40/49 |
| 2024/0311558 A1* | 9/2024 | DiMarco | G06F 40/20 |
| 2024/0428270 A1* | 12/2024 | Rudrakar | G06Q 40/04 |

* cited by examiner

METHOD AND SYSTEM FOR IMPLEMENTING A TOOL FOR DETECTING BAD ACTORS THAT UNFAIRLY PROFIT FROM CONFIDENTIAL INFORMATION

BACKGROUND

1. Field of the Invention

The field of the invention disclosed herein generally relates to a system for implementing an unfair profit detection tool and, more particularly, to a method, system, and computer-readable storage medium for implementing technology for an unfair profit detection tool that detects potential bad actors that unfairly profit from confidential information.

2. Background of the Invention

In most countries around the World, entities that have a relationship as (or with) an affiliate of a business are legally prohibited from using that relationship to unfairly profit from confidential information of the business. However, although such unfair use of confidential information is long-standing and widespread, it remains difficult to prove such a malfeasance since most investigations merely rely on circumstantial evidence and reasonable inferences because authorities rarely have direct evidence of that type of malfeasance.

Nonetheless, although entities have been unfairly profiting from confidential business information for some time now, the prevalence of such bad actors grew with the advent of the Internet and, today, the so-called "dark web" (or "darknet") provides a huge marketplace for the actual commercialization of confidential business information. Moreover, the Information Age has left authorities with a vast amount of information to comb through, and such large datasets (referred to as "big data") render conventional techniques ineffective for the detection of entities that unfairly use confidential business information for financial gain.

For example, the immense quantity of complex data that is constantly being generated by today's media sources is far too large to effectively process all that data manually or with traditional data-processing software. Furthermore, the most recent strides of advancement in information technology have led to the emergence of blockchain technology, which has numerous groundbreaking applications including cryptocurrency. However, the pseudonymity provided by cryptocurrency, for example, has made it even harder to detect (but has also attracted yet even more) bad actors that unfairly use confidential business information for financial gain.

Accordingly, there is a need in the field of the herein-disclosed invention for a technical solution to the foregoing drawbacks of the existing technology for detecting entities that unfairly profit from confidential information of a business.

SUMMARY

The present disclosure, through one or more of its various aspects, embodiments, and/or specific features or sub-component, provides, inter alia, various systems, servers, devices, methods, media, programs and platforms for implementing a tool for detecting bad actors that unfairly profit from confidential information.

According to an aspect of the present disclosure, a method is provided for implementing a tool for detecting bad actors that unfairly profit from confidential information. The method may comprise: obtaining, from at least one news media source, news media data that comprises a plurality of news articles; categorizing, by pertinent events, each article of the plurality of news articles according to the pertinent events to which the news media data pertains; scoring each article of the plurality of news articles according to a respective impact of each article of the plurality of news articles; designating, for each of the pertinent events to which the news media data pertains, a corresponding made-public-date; and calculating, for each event of the pertinent events to which the news media data pertains, a corresponding event impact score. Each corresponding made-public-date comprises an initial publication date of an earliest news article of a corresponding set of news articles that pertain to a corresponding event, and the news media data may be embodied in one or more from among binary code, video, audio, text and other visible code, etc.

In the method, the method may further comprise: determining a respective sentiment score for each respective article of the plurality of news articles; utilizing each of a plurality of distinct AI algorithms to determine the respective sentiment score for each respective article; based on an algorithmic weighted average of the respective sentiment score for each respective article that is determined by each of the plurality of distinct AI algorithms, identifying a final sentiment score; and calculating, for each event of the pertinent events to which the news media data pertains, a corresponding sentiment score. The respective sentiment score for each respective article is based on at least one from among a respective positive and a respective negative sentiment of the respective article.

In the method, the method may further comprise: naming each event of the pertinent events; summarizing, for each respective event of the pertinent events, relevant text of the respective event, a core meaning of the relevant text of the respective event; and summarizing an illicit action of the bad actor.

In the method, the obtaining may comprise continuously streaming the news media data from the at least one news media source, and parallel processing may be utilized to perform the obtaining the news media data from the at least one news media source.

In the method, at least a first artificial intelligence and machine learning (AI/ML) model may be utilized to perform the categorizing of each of the plurality of news media articles.

In the method, the categorizing may comprise: determining that the news media data comprises relevant information pertaining to a first event; and associating each news article of a first set of news articles with the first event. The first set of news articles may comprise at least one of the plurality of news articles that pertains to the first event.

In the method, the scoring may comprise generating, for each news article of the first set of news articles, a corresponding article impact score of a first set of corresponding article impact scores. Each of the first set of corresponding article impact scores may indicate a corresponding impact that an initial publication of a corresponding news article had on a free market, and the corresponding impact may be based on an amount of a change in a valuation of an asset that is pertinent to the corresponding news article.

In the method, at least a second AI/ML model may be utilized to perform the scoring.

In the method, the change in the valuation of the asset may occur within a time period that corresponds to the initial publication of the corresponding news article.

In the method, the calculating may comprise calculating, for the first event, a first event impact score. The first event impact score may be based on a weighted combination of each corresponding article impact score of the first set of corresponding article impact scores.

In the method, the designating may comprise designating, for the first event, a first made-public-date. The first made-public-date may comprise an earliest publication date of an article of the first set of news articles. Additionally, each of the plurality of news articles may comprise a corresponding timestamp that comprises a corresponding publication date of a corresponding news article, and the designating may be based on a first timestamp that comprises the first made-public-date.

In the method, the method may further comprise identifying an anomaly in the free market. The anomaly may pertain to the first event and may comprise an increase in a net valuation of assets of a suspect, and the increase in the net valuation may stem from a suspicious transaction that occurred after a date of the first event and prior to the first made-public-date.

In the method, at least a third AI/ML model may be utilized to perform the identifying of the anomaly in the free market.

In the method, the method may further comprise determining whether the suspect is a potential bad actor. The potential bad actor may comprise at least one from among: a business affiliate that is responsible for a private affair of a business that is affiliated with at least one transaction that involves the asset; and an entity that has had a relationship with the business affiliate. The transaction may occur at a time that corresponds to the first event. Additionally, the potential bad actor may have: obtained nonpublic information about the first event, from the business affiliate, prior to the first made-public-date; and utilized the nonpublic information to make the suspicious transaction.

In the method, at least a fourth AI/ML model may be utilized to perform the determining whether the suspect is the potential bad actor.

In the method, the method may further comprise transmitting, to an expert for feedback, a description of the anomaly and a description of the bad actor. The expert may comprise at least one from among a user, software, memory, database, and at least a fifth AI/ML model.

In the method, the method may further comprise: receiving expert feedback from the expert; and utilizing the expert feedback to perform, on a training dataset for at least the fourth AI/ML model, at least one from among the following operations: training and tuning.

According to another aspect of the present disclosure, a system is provided for implementing a tool for detecting bad actors that unfairly profit from confidential information. The system may comprise: a processor; and memory storing executable instructions. When executed by the processor, the instructions may cause the processor to perform operations comprising: obtaining, from at least one news media source, news media data that comprises a plurality of news articles; categorizing, by pertinent events, each article of the plurality of news articles according to the pertinent events to which the news media data pertains; scoring each article of the plurality of news articles according to a respective impact of each article of the plurality of news articles; designating, for each of the pertinent events to which the news media data pertains, a corresponding made-public-date; and calculating, for each event of the pertinent events to which the news media data pertains, a corresponding event impact score. Each corresponding made-public-date comprises an initial publication date of an earliest news article of a corresponding set of news articles that pertain to a corresponding event, and the news media data may be embodied in one or more from among binary code, video, audio, text and other visible code, etc.

In the system, when executed by the processor, the instructions may further cause the processor to: determine a respective sentiment score for each respective article of the plurality of news articles; utilize each of a plurality of distinct AI algorithms to determine the respective sentiment score for each respective article; based on an algorithmic weighted average of the respective sentiment score for each respective article that is determined by each of the plurality of distinct AI algorithms, identify a final sentiment score; and calculate, for each event of the pertinent events to which the news media data pertains, a corresponding sentiment score. The respective sentiment score for each respective article is based on at least one from among a respective positive and a respective negative sentiment of the respective article.

In the system, when executed by the processor, the instructions may further cause the processor to: name each event of the pertinent events; summarize, for each respective event of the pertinent events, relevant text of the respective event, a core meaning of the relevant text of the respective event; and summarize an illicit action of the bad actor.

In the system, the obtaining may comprise continuously streaming the news media data from the at least one news media source, and parallel processing may be utilized to perform the obtaining the news media data from the at least one news media source.

In the system, at least a sixth AI/ML model may be utilized to perform the categorizing of each of the plurality of news media articles.

In the system, the categorizing may comprise: determining that the news media data comprises relevant information pertaining to a first event; and associating each news article of a first set of news articles with the first event. The first set of news articles may comprise at least one of the plurality of news articles that pertains to the first event.

In the system, the scoring may comprise generating, for each news article of the first set of news articles, a corresponding article impact score of a first set of corresponding article impact scores. Each of the first set of corresponding article impact scores may indicate a corresponding impact that an initial publication of a corresponding news article had on a free market, and the corresponding impact may be based on an amount of a change in a valuation of an asset that is pertinent to the corresponding news article.

In the system, at least a seventh AI/ML model may be utilized to perform the scoring.

In the system, the change in the valuation of the asset may occur within a time period that corresponds to the initial publication of the corresponding news article.

In the system, the calculating may comprise calculating, for the first event, a first event impact score. The first event impact score may be based on a weighted combination of each corresponding article impact score of the first set of corresponding article impact scores.

In the system, the designating may comprise designating, for the first event, a first made-public-date. The first made-public-date may comprise an earliest publication date of an article of the first set of news articles. Additionally, each of the plurality of news articles may comprise a corresponding timestamp that comprises a corresponding publication date of a corresponding news article, and the designating may be based on a first timestamp that comprises the first made-public-date.

In the system, when executed by the processor, the instructions may further cause the processor to identify an anomaly in the free market. The anomaly may pertain to the first event and may comprise an increase in a net valuation of assets of a suspect, and the increase in the net valuation may stem from a suspicious transaction that occurred after a date of the first event and prior to the first made-public-date.

In the system, at least an eighth AI/ML model may be utilized to perform the identifying of the anomaly in the free market.

In the system, when executed by the processor, the instructions may also cause the processor to perform further operations comprising determining whether the suspect is a potential bad actor. The potential bad actor may comprise at least one from among: a business affiliate that is responsible for a private affair of a business that is affiliated with at least one transaction that involves the asset; and an entity that has had a relationship with the business affiliate. The transaction may occur at a time that corresponds to the first event. Additionally, the potential bad actor may have: obtained nonpublic information about the first event, from the business affiliate, prior to the first made-public-date; and utilized the nonpublic information to make the suspicious transaction.

In the system, at least a ninth AI/ML model may be utilized to perform the determining whether the suspect is the potential bad actor.

In the system, when executed by the processor, the instructions may further cause the processor to transmit, to an expert for feedback, a description of the anomaly and a description of the bad actor. The expert may comprise at least one from among a user, software, memory, database, and at least a tenth AI/ML model.

In the system, when executed by the processor, the instructions may further cause the processor to: receive expert feedback from the expert; and utilize the expert feedback to perform, on a training dataset for at least the ninth AI/ML model, at least one from among the following operations: training and tuning.

According to yet a further aspect of the present disclosure, a non-transitory computer-readable medium is provided for implementing a tool for detecting bad actors that unfairly profit from confidential information. The non-transitory computer-readable medium may store instructions that, when executed by a processor, cause the processor to perform operations comprising: obtaining, from at least one news media source, news media data that comprises a plurality of news articles; categorizing, by pertinent events, each article of the plurality of news articles according to the pertinent events to which the news media data pertains; scoring each article of the plurality of news articles according to a respective impact of each article of the plurality of news articles; designating, for each of the pertinent events to which the news media data pertains, a corresponding made-public-date; and calculating, for each event of the pertinent events to which the news media data pertains, a corresponding event impact score. Each corresponding made-public-date comprises an initial publication date of an earliest news article of a corresponding set of news articles that pertain to a corresponding event, and the news media data may be embodied in one or more from among binary code, video, audio, text and other visible code, etc.

In the non-transitory computer-readable medium, when executed by the processor, the instructions may further cause the processor to: determine a respective sentiment score for each respective article of the plurality of news articles; utilize each of a plurality of distinct AI algorithms to determine the respective sentiment score for each respective article; based on an algorithmic weighted average of the respective sentiment score for each respective article that is determined by each of the plurality of distinct AI algorithms, identify a final sentiment score; and calculate, for each event of the pertinent events to which the news media data pertains, a corresponding sentiment score. The respective sentiment score for each respective article is based on at least one from among a respective positive and a respective negative sentiment of the respective article.

In the non-transitory computer-readable medium, when executed by the processor, the instructions may further cause the processor to: name each event of the pertinent events; summarize, for each respective event of the pertinent events, relevant text of the respective event, a core meaning of the relevant text of the respective event; and summarize an illicit action of the bad actor.

In the non-transitory computer-readable medium, the obtaining may comprise continuously streaming the news media data from the at least one news media source, and parallel processing may be utilized to perform the obtaining the news media data from the at least one news media source.

In the non-transitory computer-readable medium, at least an eleventh AI/ML model may be utilized to perform the categorizing of each of the plurality of news media articles.

In the non-transitory computer-readable medium, the categorizing may comprise: determining that the news media data comprises relevant information pertaining to a first event; and associating each news article of a first set of news articles with the first event. The first set of news articles may comprise at least one of the plurality of news articles that pertains to the first event.

In the non-transitory computer-readable medium, the scoring may comprise generating, for each news article of the first set of news articles, a corresponding article impact score of a first set of corresponding article impact scores. Each of the first set of corresponding article impact scores may indicate a corresponding impact that an initial publication of a corresponding news article had on a free market, and the corresponding impact may be based on an amount of a change in a valuation of an asset that is pertinent to the corresponding news article.

In the non-transitory computer-readable medium, at least a twelfth AI/ML model may be utilized to perform the scoring.

In the non-transitory computer-readable medium, the change in the valuation of the asset may occur within a time period that corresponds to the initial publication of the corresponding news article.

In the non-transitory computer-readable medium, the calculating may comprise calculating, for the first event, a first event impact score. The first event impact score may be based on a weighted combination of each corresponding article impact score of the first set of corresponding article impact scores.

In the non-transitory computer-readable medium, the designating may comprise designating, for the first event, a first made-public-date. The first made-public-date may comprise an earliest publication date of an article of the first set of news articles. Additionally, each of the plurality of news articles may comprise a corresponding timestamp that comprises a corresponding publication date of a corresponding news article, and the designating may be based on a first timestamp that comprises the first made-public-date.

In the non-transitory computer-readable medium, when executed by the processor, the instructions may further cause the processor to identify an anomaly in the free market. The anomaly may pertain to the first event and may comprise an increase in a net valuation of assets of a suspect, and the increase in the net valuation may stem from a suspicious transaction that occurred after a date of the first event and prior to the first made-public-date.

In the non-transitory computer-readable medium, at least a thirteenth AI/ML model may be utilized to perform the identifying of the anomaly in the free market.

In the non-transitory computer-readable medium, when executed by the processor, the instructions may also cause the processor to perform further instructions comprising determining whether the suspect is a potential bad actor. The potential bad actor may comprise at least one from among: a business affiliate that is responsible for a private affair of a business that is affiliated with at least one transaction that involves the asset; and an entity that has had a relationship with the business affiliate. The transaction may occur at a time that corresponds to the first event. Additionally, the potential bad actor may have: obtained nonpublic information about the first event, from the business affiliate, prior to the first made-public-date; and utilized the nonpublic information to make the suspicious transaction.

In the non-transitory computer-readable medium, at least a fourteenth AI/ML model may be utilized to perform the determining whether the suspect is the potential bad actor.

In the non-transitory computer-readable medium, when executed by the processor, the instructions may further cause the processor to transmit, to an expert for feedback, a description of the anomaly and a description of the bad actor. The expert may comprise at least one from among a user, software, memory, database, and at least a fifteenth AI/ML model.

In the non-transitory computer-readable medium, when executed by the processor, the instructions may further cause the processor to: receive expert feedback from the expert; and utilize the expert feedback to perform, on a training dataset for at least the fourthteenth AI/ML model, at least one from among the following operations: training and tuning.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure are intended to bring out one or more of the advantages as specifically described above and noted below.

The examples may also be embodied as one or more non-transitory computer readable storage media having instructions stored thereon for one or more aspects of the present technology as described and illustrated by way of the examples herein. In some examples, the instructions include executable code that, when executed by one or more processors, cause the processors to carry out steps necessary to implement the methods of the examples of this technology that are described and illustrated herein.

Figure 1:
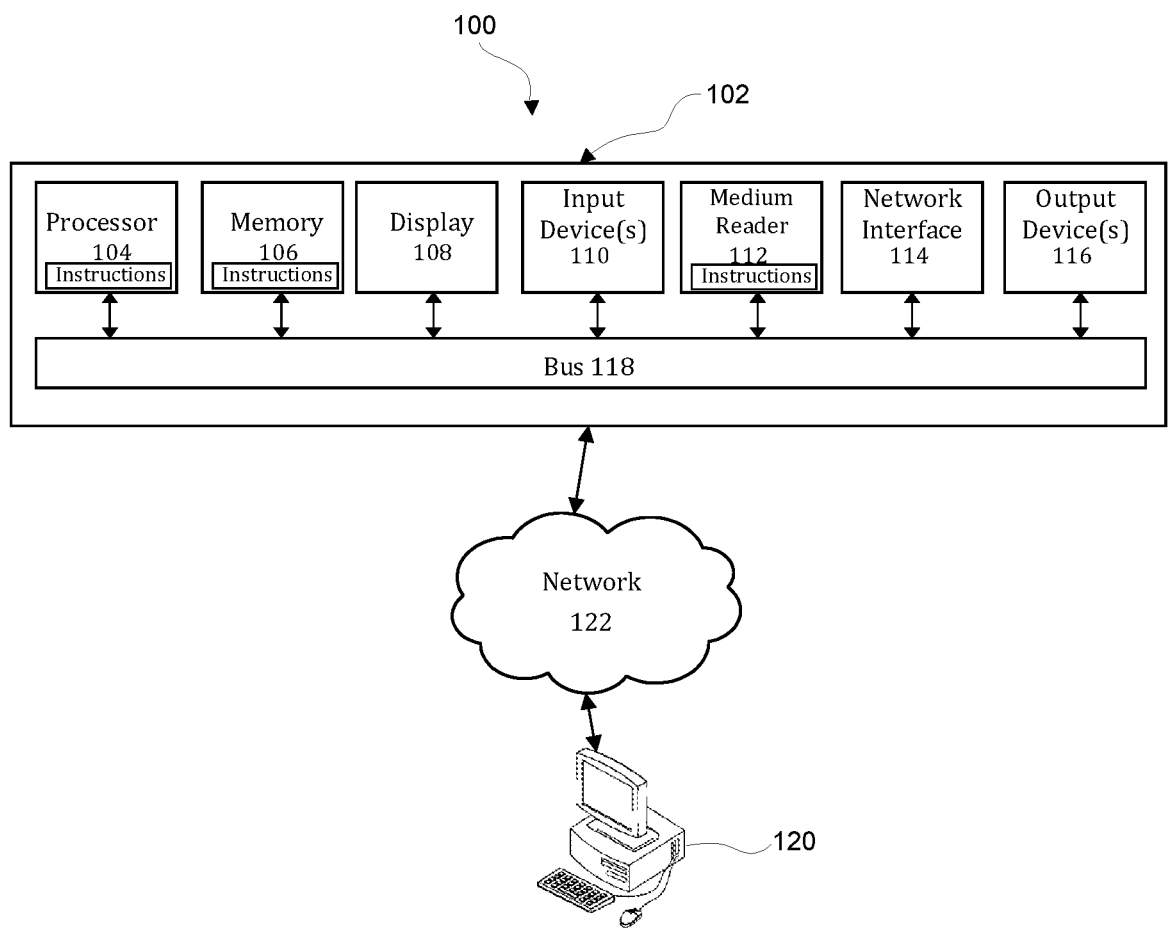
FIG. 1 is a diagram of an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide methods and systems for implementing an Unfair Profit Detection Tool that detects potential bad actor that unfairly profit from confidential information.

Figure 2:
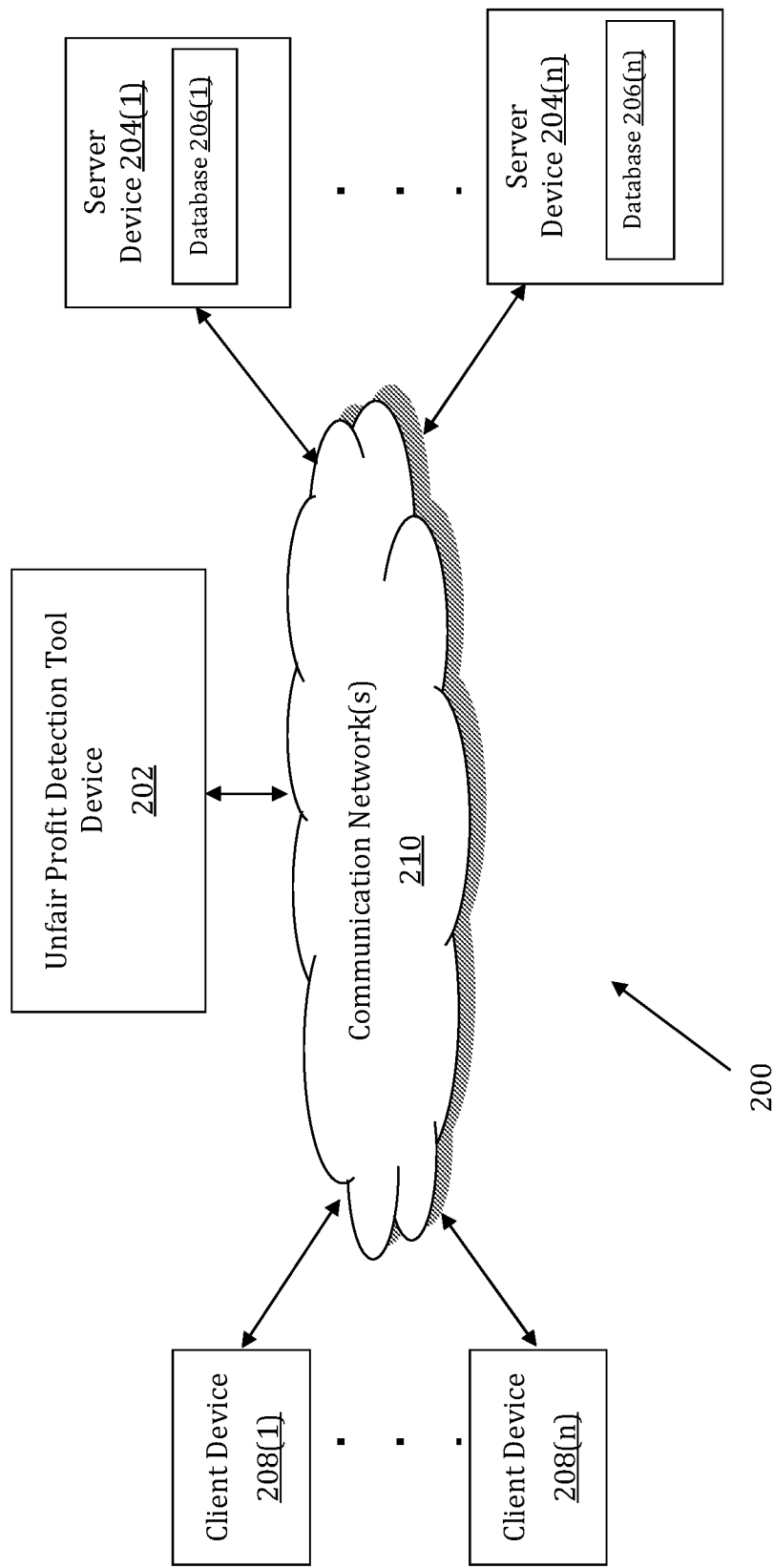
FIG. 2 is a diagram of an exemplary network environment that implements an unfair profit detection tool that detects potential bad actors that unfairly profit from confidential information.

Referring to FIG. 2, a schematic of an exemplary network environment 200 an exemplary network environment that implements an Unfair Profit Detection Tool, is illustrated. In an exemplary embodiment, the Unfair Profit Detection Tool may be implemented on any networked computer platform, such as, for example, a personal computer (PC).

A method for implementing technology for detecting bad actors that unfairly profit from confidential information may be implemented by an Unfair Profit Detection Tool (UPDT) device 202. The UPDT device 202 may be the same or similar to the computer system 102 as described with respect to FIG. 1. The UPDT device 202 may be a rack-mounted server in a datacenter, an embedded microcontroller (MCU) in an electronic device, or another type of headless system, which is a computer system or device that is configured to operate without a monitor, keyboard and mouse. The UPDT device 202 may store one or more applications that can include executable instructions that, when executed by the UPDT device 202, cause the UPDT device 202 to perform actions, such as to transmit, receive, or otherwise process network communications, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the UPDT device 202 itself, may be located in virtual server(s) running in a cloud-based computing environment rather than being tied to one or more specific physical network computing devices. Also, the application(s) may be running in one or more virtual machines (VMs) executing on the UPDT device 202. Additionally, in one or more embodiments of this technology, virtual machine(s) running on the UPDT device 202 may be managed or supervised by a hypervisor.

In the network environment 200 of FIG. 2, the UPDT device 202 is coupled to a plurality of server devices 204(1)-204(n) that hosts a plurality of databases 206(1)-206 (n), and also to a plurality of client devices 208(1)-208(n) via communication network(s) 210. A communication interface of the UPDT device 202, such as the network interface 114 of the computer system 102 of FIG. 1, operatively couples and communicates between the UPDT device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the UPDT device 202, the server devices 204 (1)-204 (n), and/or the client devices 208 (1)-208 (n) may be coupled together via other topologies. Additionally, the network environment 200 may include other network devices such as one or more routers and/or switches, for example, which are well known in the art and thus will not be described herein. This technology provides a number of advantages including methods, computer readable media, and UPDT devices that efficiently implement a method for an Unfair Profit Detection Tool that detects potential bad actors that unfairly profit from confidential information.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The UPDT device 202 may be a standalone device or integrated with one or more other devices or apparatuses, such as one or more of the server devices 204(1)-204(n), for example. In one particular example, the UPDT device 202 may include or be hosted by one of the server devices 204(1)-204(n), and other arrangements are also possible. As another example, the UPDT device 202 may be integrated with one or more other devices or apparatuses, such as one or more of the client devices 208(1)-208(n). Moreover, one or more of the devices of the UPDT device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204 (n) may include, among other features, one or more processors, a memory, and a communication interface, which are coupled together by a bus or other communication link, although other numbers and/or types of network devices may be used. The server devices 204(1)-204(n) in this example may process requests received from the UPDT device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206 (n) that are configured to store data that relates to a variety of databases, and one or more from among databases 206 (1)-206(n) may comprise one or more from among an internal business data repository, employee records database, financial records database. news media database, social media database, etc.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the UPDT device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the UPDT device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the UPDT device 202, the server devices 204(1)-204(n), the databases 206(1)-206(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the UPDT device 202, the server devices 204(1)-204(n), the databases 206(1)-206(n), or the client devices 208(1)-208(n), for example, may be configured to operate as virtual instances on the same physical machine. In other words, one or more of the UPDT device 202, the server devices 204(1)-204(n), the databases 206(1)-206(n), or the client devices 208(1)-208(n) may operate on the same physical device rather than as separate devices communicating through communication network(s) 210. Additionally, there may be more or fewer UPDT devices 202, server devices 204(1)-204(n), databases 206(1)-206(n), or client devices 208(1)-208(n) than illustrated in FIG. 2.

In addition, two or more computing systems, databases or devices may be substituted for any one of the systems, databases or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
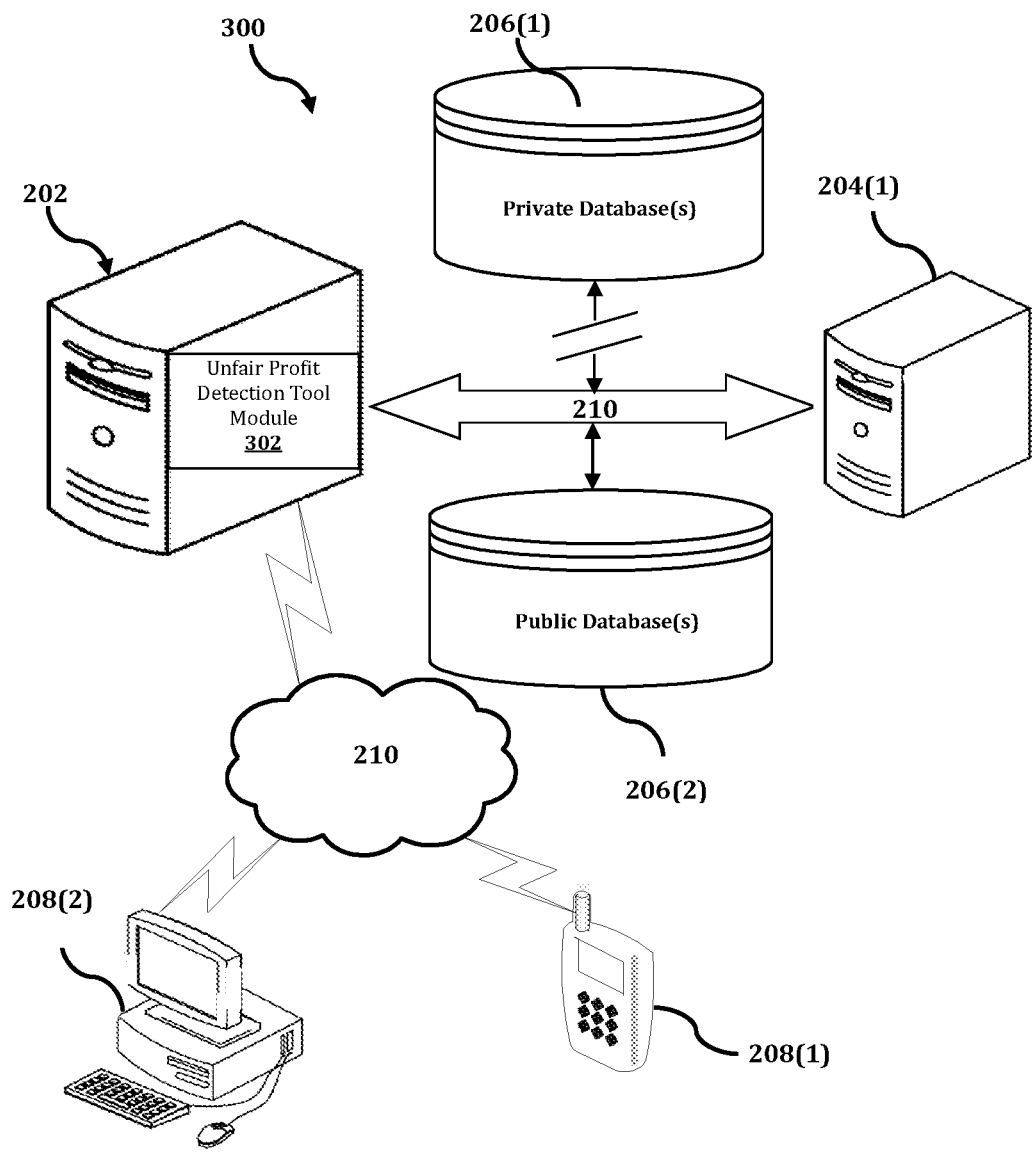
FIG. 3 is a diagram of an exemplary perspective of a network environment that utilizes an unfair profit detection tool to detect bad actors that unfairly profit from confidential information.

The UPDT device 202 is described and illustrated in FIG. 3 as including Unfair Profit Detection Tool module 302, although it may include other rules, policies, modules, databases, or applications, for example. As will be described below, Unfair Profit Detection Tool module 302 is configured to detect potential bad actors that unfairly profit from confidential information. Unfair Profit Detection Tool module 302 may include software that is based on a microservices architecture.

Unfair Profit Detection Tool module 302 may be integrated with one or more devices or apparatuses, such as client devices 208(1)-208(n), where Unfair Profit Detection Tool module 302 may be implemented as an application or as an addon or plugin to another application of the one or more devices or apparatuses, and where Unfair Profit Detection Tool module 302 may execute in the background.

An exemplary process 300 for application of an Unfair Profit Detection Tool to an aspect of the network environment of FIG. 2 is illustrated as being executed in FIG. 3. Specifically, a first client device 208(1) and a second client device 208(2) are illustrated as being in communication with UPDT device 202. In this regard, the first client device 208(1) and the second client device 208(2) may be "clients" of the UPDT device 202 and are described herein as such. Nevertheless, it is to be known and understood that the first client device 208(1) and/or the second client device 208(2) need not necessarily be "clients" of the UPDT device 202, or any entity described in association therewith herein. Any additional or alternative relationship may exist between either or both of first client device 208(1), second client device 208(2) and UPDT device 202, or no relationship may exist.

Further, UPDT device 202 is illustrated as being able to access private database(s) 206(1), and public database(s) 206(2). UPDT device 202 may comprise an Unfair Profit Detection Tool that communicates with public database(s) 206(1). In addition, the Unfair Profit Detection Tool of UPDT device 202 may also communicate with public database(s) 206(2). The Unfair Profit Detection Tool module 302 may be configured to access these databases in order to detect potential bad actor that unfairly profit from confidential information.

Moreover, UPDT device 202 may receive and transmit data via communication network(s) 210. UPDT device 202 may receive and transmit data such as code that is written in one or more of the following dialects: transaction control language (TCL), data manipulation language (DML), data control language (DCL) and data definition language (DFL). Additionally, via communication network(s) 210, UPDT device 202 may respectively receive and transmit data from and to one or more of the following devices: server device 204(1), private database(s) 206(1), public database(s) 206

(2), first client device 208(1), the second client device 208(2), and communication network(s) 210, for example.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The client devices 208(1)-208(n) may represent, for example, computer systems of an organization or database network. The first client device 208(1) represent, for example, one or more computer systems of a department or cluster within the organization or database network. Of course, the first client device 208(1) may include one or more of any of the devices described herein. The second client device 208(2) may be, for example, one or more computer systems of another department or cluster within the organization or database network. Of course, the second client device 208(2) may include one or more of any of the devices described herein.

The process may be executed via the communication network(s) 210, which may comprise plural networks as described above. For example, in an exemplary embodiment, either or both of the first client device 208(1) and the second client device 208(2) may communicate with the UPDT device 202 via broadband or cellular communication. Of course, these embodiments are merely exemplary and are not limiting or exhaustive.

Unfair Profit Detection Tool module 302 may execute a process for implementing an Unfair Profit Detection Tool that detects potential bad actors that unfairly profit from confidential information. An exemplary process for implementing a tool for detecting bad actors that unfairly profit from confidential information is generally indicated at flowchart 400 in FIG. 4.

Figure 4:
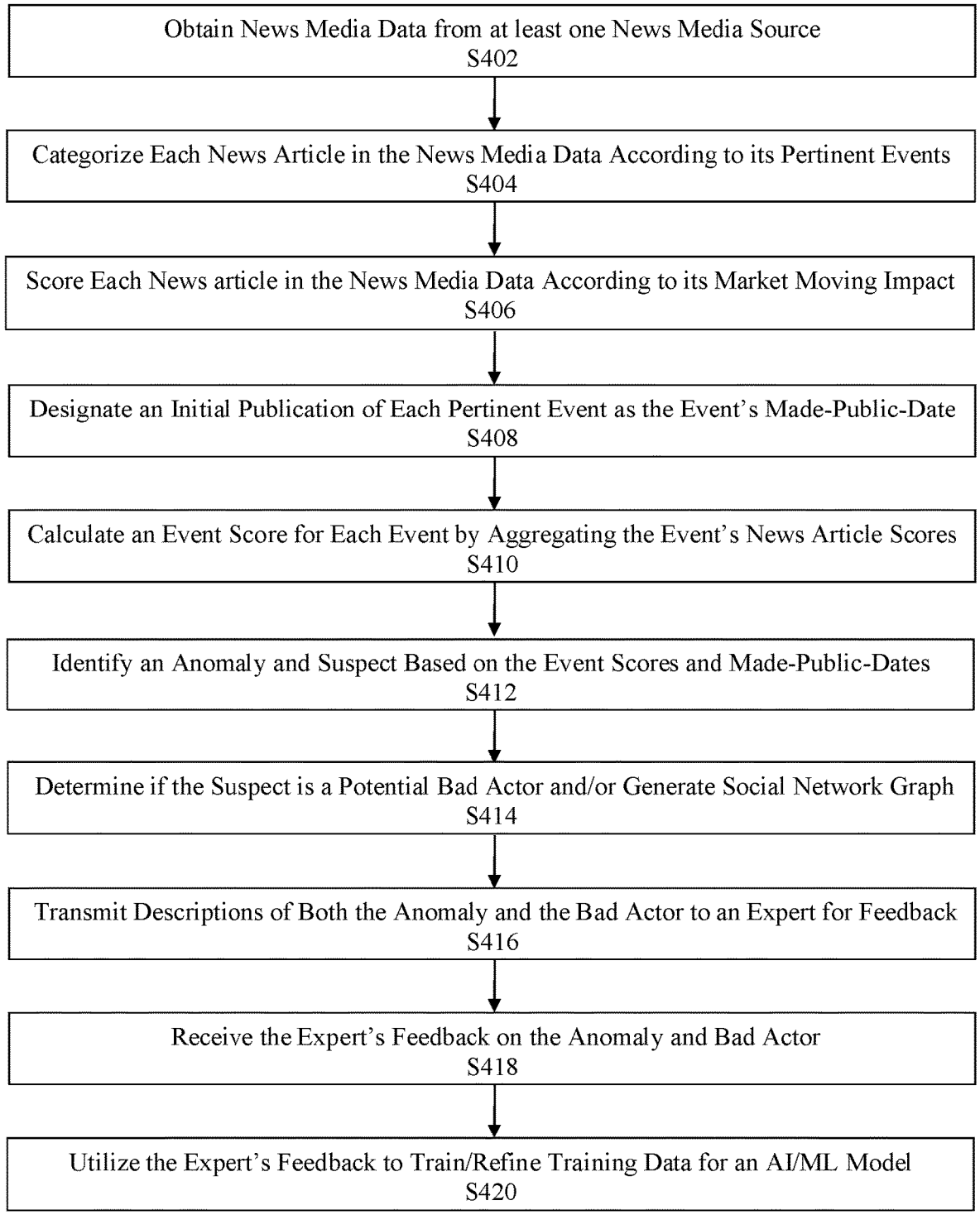
FIG. 4 is a flowchart of an exemplary process for implementing an unfair profit detection tool that detects potential bad actors that unfairly profit from confidential information.

In process 400 of FIG. 4, at step S402, Unfair Profit Detection Tool module 302 obtains news media data from at least one news media source. The news media data comprises a plurality of news articles, and parallel processing may be utilized to obtain the news media data from the at least one news media source. The at least one news media source may comprise one or more from among a private database such as private database 206(1) and a public database such as public database 206(2). In addition, the obtaining may comprise continuously streaming the news media data from the at least one news media source, and the news media data may be embodied in, but not necessarily limited to, one or more from among binary code, video, audio, text and other visible code.

At step S404, Unfair Profit Detection Tool module 302 categorizes each article of the plurality of news articles according to the pertinent events to which the news media data pertains. This categorization of step S404 comprises: determining that the news media data comprises relevant information that pertains to a first event; and associating each news article of a first set of news articles with the first event. The first set of news articles comprises at least one of the plurality of news articles that pertains to the first event. Moreover, at step S404, a first artificial intelligence and machine learning (AI/ML) model may be utilized to perform the categorizing of each of the plurality of news media articles.

Additionally, at step S404, Unfair Profit Detection Tool module 302 may name the events, create an event summary, and create a summary of all the news during the time period before and after a suspected illicit behavior.

At step S406, Unfair Profit Detection Tool module 302 scores each article of the plurality of news articles according to a respective impact of each article of the plurality of news articles. This scoring of step S406 comprises: generating, for each news article of the first set of news articles, a corresponding article impact score of a first set of corresponding article impact scores, each of which (i.e., each of the first set of corresponding article impact scores) individually indicates: (1) a free market's sentiment (ranging from completely positive to completely negative) regarding a corresponding article; and (2) a corresponding impact that an initial publication of the corresponding news article had on the free market.

At step S406, the corresponding impact may be based on an amount of a change in a valuation of an asset that is pertinent to the corresponding news article, and the change in the valuation of the asset occurs within a time period that corresponds to the initial publication of the corresponding news article. Moreover, at step S406, a second AI/ML model may be utilized to perform the scoring operation.

Additionally, at step S406, Unfair Profit Detection Tool module 302 may calculate an article sentiment that indicates a price direction.

At step S408, Unfair Profit Detection Tool module 302 designates, for each of the pertinent events to which the news media data pertains, a corresponding made-public-date that comprises an initial publication date of an earliest news article of a corresponding set of news articles that pertain to a corresponding event. This designation of step S408 comprises: designating, for the first event, a first made-public-date that comprises an earliest publication date of an article of the first set of news articles. It should be noted that the categorizing of step S404 improves existing technology by grouping each of the plurality of news articles according to its pertinent event(s). The technical improvement that this provides, lies in the fact that this approach makes the news media data (i.e., the plurality of news articles) more manageable, which makes the designating of step S408 feasible in large and complex data environments (e.g., big data environments). In an exemplary embodiment, each news article may comprise a timestamp of its date of publication, hence the designation of step S408 may be based on a first timestamp that comprises the first made-public-date.

At step S410, Unfair Profit Detection Tool module 302 calculates, for each event of the pertinent events to which the news media data pertains, a corresponding event impact score. This calculation of step S410 comprises calculating, for the first event, a first event impact score based on a weighted combination of each corresponding article impact score that belongs to the first set of corresponding article impact scores.

At step S412, Unfair Profit Detection Tool module 302 identifies an anomaly in the free market. The anomaly identified at step S412 may pertain to the first event and comprise an increase in a net valuation of assets of an individual, that (i.e., the increase in the net valuation) stems from a suspicious transaction that occurred after a date of the first event and prior to the first made-public-date. In addition, the significance of the increase in the net valuation of an individual's assets may raise suspicions of malfeasance and, thereby, render the individual into a suspect (i.e., an individual that is suspected of committing a malfeasance).

Additionally, at step S412, Unfair Profit Detection Tool module 302 may also identify relevant suspect attributes, such as whether a suspect lives in a same place that a traded company is headquartered, or whether a suspect is employed in a same industry as a traded company.

At step S414, Unfair Profit Detection Tool module 302 determines whether a suspect is a potential bad actor, which comprises at least one from among: (1) an business affiliate that is responsible for a private affair of a business that is affiliated with at least one transaction that involves the asset and occurs at a time that corresponds to the first event; and (2) an entity that has had a relationship with the business affiliate. Additionally, the potential bad actor is also a suspect that has: (1) obtained nonpublic information about the first event, from the business affiliate, prior to the first made-public-date; and (2) utilized the nonpublic information to make the suspicious transaction. Furthermore, repeat offenses may be utilize to determine whether the suspect is the potential bad actor. Moreover, at step S414, a third AI/ML model may be utilized to determine whether the suspect is the potential bad actor.

In addition, at step S414, Unfair Profit Detection Tool module 302 may utilize a social network graph to map the relationship(s) between the suspect and the business affiliate, which may be more than one individual. This social network graph may indicate any business affiliate with whom the suspect has a relationship and may further indicate the extent of that relationship, which is not limited to any period of time. In other words, the relationship(s) mapped to the social network graph is/are maintained in perpetuity and help to determine whether the suspect is actually a "bad actor." The social network graph may contain a path with one or more linked people from the bad actor to the source of information, the "leaker." The social network graph may contain multiple paths to the source of information. Each path is rated for its strength with AI which takes into account the number of linked people and the strength of the individual bonds between them. The strength of the bonds between people is a measure of their trust and is calculated by taking into account factors such as, but not limited to whether the people are on a team, have electronic communications between them, frequency of communication, are family or household members, went to school together, are written about in the same news articles, work in the same industry, or work or live in proximity.

The graph may be built from internal company data such as employee teams, employee electronic communications, employee badge swipes, employee and client work locations, employee and client home addresses, and client related parties such as family, household members, attorneys, financial advisors, and accountants. Additionally or alternatively, the graph may be built form external data such as news articles showing a connection between people, online photos or videos placing two people together, and social media connections and posts.

Moreover, at step S414, Unfair Profit Detection Tool module 302 may also identify a source of nonpublic information such as confidential business-related information or Material Non-Public Information (MNPI). For example, a record that the suspect clicked on a display of the nonpublic information several times (e.g., three or more) indicates that the suspect had possession of the nonpublic information at that time, and this indication may be further reinforced each time the suspect clicks on the nonpublic information.

In an exemplary embodiment, a coverage table may be maintained within a corresponding database such as one of private databases 206(1). In the exemplary embodiment, the coverage table may identify the advisors of an organization, the coverage table may additionally or alternatively identify the team(s) to which each advisor belongs, and/or the coverage table may also additionally or alternatively identify the client(s) that each of the organization's advisors cover. In the exemplary embodiment, the coverage table may be utilized to generate one or more social network graphs at step S414.

In a further exemplary embodiment, additionally or alternatively, an organization may maintain a list of relationships that various entities have with affiliates of the organization. The listed relationships may have been disclosed by the affiliates of the organization, one or more entities with which the affiliates have a relationship, and/or the listed relationships may have been obtained from another source. In the further embodiment, the listed relationships may include friendships, family members, accountants, advisors, and/or other relationships such as agencies or fiduciary relationships. Additionally, in the further exemplary embodiment, current and former insiders of an organization may all be presumed to know one another and thus may be included in the listed relationships. Moreover, in the further exemplary embodiment, an affiliate of an organization may self-disclose one or more of its relationships via a disclosure process of the organization. Furthermore, in the further exemplary embodiment, the listed relationships may include a correspondence between a name and/or address of more than one entity. Additionally or alternatively, in the further exemplary embodiment the listed relationships of entities may correspond to those entities' (e.g., employees') respective physical location within their organization (e.g., place of employment), where the closer physical proximity and/or longer period of time during which such proximity exists, directly correlates to a stronger bond. In the exemplary embodiment, the listed relationships may be utilized to generate one or more social network graphs at step S414.

In yet a further exemplary embodiment, a government entity such as the Securities and Exchange Commissions (SEC) may comprise a public database such as database 206(2). For example, in the yet further exemplary embodiment, database 206(2) may comprise the Securities and Exchange Commission's (SEC) EDGAR database, which includes a list of current and former agents (or insiders) of an organization, that have been recorded with the government entity as such. An agent or insider of an organization may be the CEO, a director, and/or a board member of the organization, and/or an entity that owns more than 10% of the organization's equity. In the yet further exemplary embodiment, a government entity's database such as one of public database(s) 206(2) may be utilized to generate one or more social network graphs at step S414.

In another exemplary embodiment, an organization may record all of its electronic exchanges. Accordingly, in this other exemplary embodiment, an electronic exchange between more than one entity may be utilized to assess a relationship between these entities. In this other exemplary embodiment, the organization's electronic exchanges may be utilized to generate one or more social network graphs of "who knows who," where the strength of a relationship may directly correlate to the number of exchanges between the entities in the relationship. Additionally, in this other embodiment, a two-way electronic exchange may be considered to correspond to a stronger bond than a one-way exchange. Moreover, in this other embodiment, when an effort to unfairly profit from confidential information is a subject of an electronic exchange prior to the actual effort to unfairly profit from the confidential information, such an electronic exchange may be considered a red flag and/or may be considered to explicitly correspond to wrongdoing. In this other embodiment, one or more of the above-mentioned electronic exchanges may be utilized to generate one or more social network graphs at step S414.

In any of the above-mentioned exemplary embodiments, one or more social network graphs that may be generated at step S414 may be generated based on any one or more of the above-mentioned embodiments.

Additionally, at step S414, Unfair Profit Detection Tool module 302 may generate a social network graph that identifies a source of material non-public information used by a bad actor to profit unfairly. The social network graph may be generated from advisor client coverage data, JPMC teams, JPMC E-Communications, or from people who appear together in the news or in school graduation lists or who are social media friends or connections.

At step S416, Unfair Profit Detection Tool module 302 transmits, to an expert for feedback, a description of the anomaly and a description of the potential bad actor. The expert may comprise any type of expert including, but not limited to, at least one from among: a user; software; memory; database; and a fourth AI/ML model.

Additionally, at step S416, Profit Detection Tool module 302 may transmit descriptions of an AI risk, score, news articles, news events, news summaries, and news scores to an expert for feedback.

Optionally, at step S418, Unfair Profit Detection Tool module 302 receives expert feedback from the expert and, then, at step S420, Unfair Profit Detection Tool module 302 utilizes the expert feedback to perform-on a training dataset for at least the third AI/ML model—at least one from among the following operations: training and tuning.

Although the first through fourth AI/ML models have been disclosed as distinct AI/ML models, the first through fourth AI/ML models are not limited thereto. Any of the functions described herein may be performed by an AI/ML model or any combination of the first through fourth AI/ML models. Moreover, all of the functions described herein may be performed by a single AI/ML model, and this single AI/ML model may include the first through fourth AI/ML models.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

The invention claimed is:

1. A method for implementing a tool for detecting bad actors that unfairly profit from confidential information, the method comprising:
    obtaining news media data from at least one news media source, wherein the news media data comprises a plurality of news articles;
    categorizing, by pertinent events, each article of the plurality of news articles according to the pertinent events to which the news media data pertains;
    scoring each article of the plurality of news articles according to a respective impact of each article of the plurality of news articles;
    designating, for each of the pertinent events to which the news media data pertains, a corresponding made-public-date, wherein each corresponding made-public-date comprises an initial publication date of an earliest news article of a corresponding set of news articles that pertain to a corresponding event;
    calculating, for each event of the pertinent events to which the news media data pertains, a corresponding event impact score;
    utilizing each of a plurality of distinct AI algorithms to determine a respective sentiment score for each respective article from among the plurality of news articles, wherein the respective sentiment score for each respective article is based on at least one from among a respective positive and a respective negative sentiment of the respective article;
    based on an algorithmic weighted average of the respective sentiment score for each respective article that is determined by each of the plurality of distinct AI algorithms, identifying a final sentiment score;
    calculating, for each event of the pertinent events to which the news media data pertains, a corresponding sentiment score;
    naming each event of the pertinent events;
    summarizing, for each respective event of the pertinent events, relevant text of the respective event, a core meaning of the relevant text of the respective event; and
    summarizing an illicit action of a bad actor.

2. The method of claim 1, wherein the obtaining comprises continuously streaming the news media data from the at least one news media source, and wherein parallel processing is utilized to perform the obtaining the news media data from the at least one news media source.

3. The method of claim 1, wherein an artificial intelligence and machine learning (AI/ML) model is utilized to perform the categorizing of each of the plurality of news media articles.

4. The method of claim 1, wherein the categorizing comprises:
    determining that the news media data comprises relevant information pertaining to a first event; and
    associating each news article of a first set of news articles with the first event, wherein the first set of news articles comprises at least one of the plurality of news articles that pertains to the first event.

5. The method of claim 4, wherein the scoring comprises:
    generating, for each news article of the first set of news articles, a corresponding article impact score of a first set of corresponding article impact scores,
    wherein each of the first set of corresponding article impact scores indicates a corresponding impact that an initial publication of a corresponding news article had on a free market, and
    wherein the corresponding impact is based on an amount of a change in a valuation of an asset that is pertinent to the corresponding news article.

6. The method of claim 5, wherein the change in the valuation of the asset occurs within a time period that corresponds to the initial publication of the corresponding news article.

7. The method of claim 5, wherein the calculating comprises:
    calculating, for the first event, a first event impact score, wherein the first event impact score is based on a weighted combination of each corresponding article impact score of the first set of corresponding article impact scores.

8. The method of claim 5, wherein the designating comprises:
    designating, for the first event, a first made-public-date, wherein the first made-public-date comprises an earliest publication date of an article of the first set of news articles.

9. The method of claim 8, wherein each of the plurality of news articles comprises a corresponding timestamp that comprises a corresponding publication date of a corresponding news article, and wherein the designating is based on a first timestamp that comprises the first made-public-date.

10. The method of claim 8, the method further comprising: identifying an anomaly in the free market,
    wherein the anomaly pertains to the first event,
    wherein the anomaly comprises an increase in a net valuation of assets of a suspect, and
    wherein the increase in the net valuation stems from a suspicious transaction that occurred after a date of the first event and prior to the first made-public-date.

11. The method of claim 10, the method further comprising: determining whether the suspect is a potential bad actor,
    wherein the potential bad actor comprises at least one from among:
    a business affiliate that is responsible for a private affair of a business that is affiliated with at least one transaction that involves the asset; and
    an entity that has had a relationship with the business affiliate, wherein the at least one transaction occurs at a time that corresponds to the first event; and
    wherein the potential bad actor:
    obtained nonpublic information about the first event, from the business affiliate, prior to the first made-public-date; and utilized the nonpublic information to make the suspicious transaction.

12. The method of claim 11, the method further comprising:
transmitting, to an expert for feedback, a description of the anomaly and a description of the bad actor, wherein the expert comprises at least one from among a user, software, memory, database, and an artificial intelligence and machine learning (AI/ML) model.

13. The method of claim 12, further comprising:
receiving expert feedback from the expert; and
utilizing the expert feedback to perform, on a training dataset for at least the fourth AI/ML model, at least one from among the following operations: training and tuning.

14. A system for implementing a tool for detecting bad actors that unfairly profit from confidential information, the system comprising:
a processor; and
memory storing instructions that, when executed by the processor, cause the processor to perform operations comprising:
obtaining news media data from at least one news media source, wherein the news media data comprises a plurality of news articles;
categorizing, by pertinent events, each article of the plurality of news articles according to the pertinent events to which the news media data pertains;
scoring each article of the plurality of news articles according to a respective impact of each article of the plurality of news articles;
designating, for each of the pertinent events to which the news media data pertains, a corresponding made-public-date, wherein each corresponding made-public-date comprises an initial publication date of an earliest news article of a corresponding set of news articles that pertain to a corresponding event;
calculating, for each event of the pertinent events to which the news media data pertains, a corresponding event impact score;
utilizing each of a plurality of distinct AI algorithms to determine a respective sentiment score for each respective article from among the plurality of news articles, wherein the respective sentiment score for each respective article is based on at least one from among a respective positive and a respective negative sentiment of the respective article;
based on an algorithmic weighted average of the respective sentiment score for each respective article that is determined by each of the plurality of distinct AI algorithms, identifying a final sentiment score;
calculating, for each event of the pertinent events to which the news media data pertains, a corresponding sentiment score;
naming each event of the pertinent events;
summarizing, for each respective event of the pertinent events, relevant text of the respective event, a core meaning of the relevant text of the respective event; and
summarizing an illicit action of a bad actor.

15. The system of claim 14, wherein the categorizing comprises:
determining that the news media data comprises relevant information pertaining to a first event; and
associating each news article of a first set of news articles with the first event, wherein the first set of news articles comprises at least one of the plurality of news articles that pertains to the first event.

16. The system of claim 15, wherein the scoring comprises:
generating, for each news article of the first set of news articles, a corresponding article impact score of a first set of corresponding article impact scores,
wherein each of the first set of corresponding article impact scores indicates a corresponding impact that an initial publication of a corresponding news article had on a free market, and
wherein the corresponding impact is based on an amount of a change in a valuation of an asset that is pertinent to the corresponding news article.

17. The system of claim 16, wherein the calculating comprises:
calculating, for the first event, a first event impact score, wherein the first event impact score is based on a weighted combination of each corresponding article impact score of the first set of corresponding article impact scores.

18. The system of claim 16, wherein the designating comprises:
designating, for the first event, a first made-public-date, wherein the first made-public-date comprises an earliest publication date of an article of the first set of news articles.

19. The system of claim 18, wherein when executed by the processor, the instructions further cause the processor to:
identify an anomaly in the free market,
wherein the anomaly pertains to the first event,
wherein the anomaly comprises an increase in a net valuation of assets of a suspect, and
wherein the increase in the net valuation stems from a suspicious transaction that occurred after a date of the first event and prior to the first made-public-date.

20. A non-transitory computer-readable medium for implementing a tool for detecting bad actors that unfairly profit from confidential information, the non-transitory computer-readable medium storing instructions that, when executed by a processor, cause the processor to perform operations comprising:
obtaining news media data from at least one news media source, wherein the news media data comprises a plurality of news articles;
categorizing, by pertinent events, each article of the plurality of news articles according to the pertinent events to which the news media data pertains;
scoring each article of the plurality of news articles according to a respective impact of each article of the plurality of news articles;
designating, for each of the pertinent events to which the news media data pertains, a corresponding made-public-date, wherein each corresponding made-public-date comprises an initial publication date of an earliest news article of a corresponding set of news articles that pertain to a corresponding event;
calculating, for each event of the pertinent events to which the news media data pertains, a corresponding event impact score;
utilizing each of a plurality of distinct AI algorithms to determine a respective sentiment score for each respective article from among the plurality of news articles, wherein the respective sentiment score for each respective article is based on at least one from among a respective positive and a respective negative sentiment of the respective article;

based on an algorithmic weighted average of the respective sentiment score for each respective article that is determined by each of the plurality of distinct AI algorithms, identifying a final sentiment score;

calculating, for each event of the pertinent events to which the news media data pertains, a corresponding sentiment score;

naming each event of the pertinent events;

summarizing, for each respective event of the pertinent events, relevant text of the respective event, a core meaning of the relevant text of the respective event; and summarizing an illicit action of a bad actor.

\* \* \* \* \*